(12) United States Patent
Attanasio (10) Patent No.: US 12,275,168 B2
(45) Date of Patent: Apr. 15, 2025

(54) MOULD SYSTEM AND A METHOD FOR MOULDING A BLADE SHELL OF A WIND TURBINE BLADE

(71) Applicant: LM WIND POWER A/S, Kolding (DK)

(72) Inventor: Francesco Attanasio, Kolding (DK)

(73) Assignee: LM WIND POWER A/S, Kolding (DK)

( * ) Notice: Subject to any disclaimer, the term of this patent is extended or adjusted under 35 U.S.C. 154(b) by 225 days.

(21) Appl. No.: 17/773,754

(22) PCT Filed: Nov. 5, 2020

(86) PCT No.: PCT/EP2020/081128
§ 371 (c)(1),
(2) Date: May 2, 2022

(87) PCT Pub. No.: WO2021/089697
PCT Pub. Date: May 14, 2021

(65) Prior Publication Data
US 2022/0371227 A1 Nov. 24, 2022

(30) Foreign Application Priority Data
Nov. 5, 2019 (GB) ..................................... 1916063

(51) Int. Cl.
*B29C 33/26* (2006.01)
*B29C 65/00* (2006.01)
(Continued)

(52) U.S. Cl.
CPC .............. *B29C 33/26* (2013.01); *B29C 66/54* (2013.01); *B29D 99/0028* (2013.01); *F03D 1/0675* (2013.01); *B29L 2031/085* (2013.01)

(58) Field of Classification Search
CPC . B29C 33/303; B29C 33/26; B29C 2033/207; B29C 33/202; B29C 33/14;
(Continued)

(56) References Cited

U.S. PATENT DOCUMENTS 2,617,126 A * 11/1952 Nebesar ..................... B63B 5/24
156/196
8,951,457 B2 * 2/2015 Galdeano .............. B29C 33/307
264/219
(Continued)

FOREIGN PATENT DOCUMENTS

CN 206073916 U 4/2017
CN 108267075 A 7/2018
WO 2019/011970 A1 1/2019

*Primary Examiner* — Matthew J Daniels
(74) *Attorney, Agent, or Firm* — Nath, Goldberg & Meyer; Jerald L. Meyer; Tanya E. Harkins (57) ABSTRACT

A mould system for moulding a blade shell of a wind turbine blade includes a first mould for manufacturing a first blade shell part and a second mould for moulding a second blade shell part. The first mould has a first moulding side with a first moulding surface defining an outer shape of the first blade shell part. The second mould has a second moulding side with a second moulding surface defining an outer shape of the second blade shell part. The mould system is configured to rotate and position the first mould such that the first moulding side is facing the second moulding side and such that the first blade shell part may be joined with the second blade shell part so as to form the blade shell. The first mould includes a first mould flange along at least a part of the periphery of the first moulding surface.

15 Claims, 8 Drawing Sheets

(51) Int. Cl.
*B29D 99/00* (2010.01)
*F03D 1/06* (2006.01)
*B29L 31/08* (2006.01)

(58) Field of Classification Search
CPC .......... B29C 2033/0094; B29C 33/005; B29C 33/0038
See application file for complete search history.

(56) References Cited

U.S. PATENT DOCUMENTS

| | | | |
|---|---|---|---|
| 2012/0205051 A1* | 8/2012 | Mironov | B29C 33/303 |
| | | | 156/389 |
| 2013/0194415 A1* | 8/2013 | Abe | G01C 11/02 |
| | | | 348/92 |
| 2014/0287084 A1* | 9/2014 | Petersen | B29C 33/0011 |
| | | | 425/451.9 |
| 2017/0266895 A1* | 9/2017 | Kehlenbeck | B29C 33/26 |
| 2018/0009177 A1* | 1/2018 | Bendel | B29C 66/547 |
| 2019/0193304 A1* | 6/2019 | Davis | B29C 33/308 |
| 2022/0111561 A1* | 4/2022 | Eriksen | B29C 33/202 |
| 2022/0118658 A1* | 4/2022 | Perkins | B29C 33/303 |

\* cited by examiner

MOULD SYSTEM AND A METHOD FOR MOULDING A BLADE SHELL OF A WIND TURBINE BLADE

This is a National Phase Application filed under 35 U.S.C. 371 as a national stage of PCT/EP2020/081128, filed Nov. 5, 2020, an application claiming the benefit of Great Britain Application No. 1916063.9, filed Nov. 5, 2019, the content of each of which is hereby incorporated by reference in its entirety.

The present disclosure relates to wind turbine blades and manufacture of wind turbine blades, More specifically, the present disclosure pertains to the field of manufacturing parts, such as shells, of a wind turbine blade with a mould system.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

To prevent the blade shell part from failing off the mould during turning and repositioning the blade shell part may be fixed to the mould with clamps. The clamps may be fixed to the outer surface of the moulds. There is a desire to reduce the number of clamps to reduce the manufacturing time and as the length of wind turbine blades and moulds increases, there is a need to monitor the clamps to detect possible deficiencies.

Furthermore, a more precise, automated and easier way of positioning the blade moulds may also reduce the total manufacturing time, improve safety during manufacturing and reduce manual labour.

SUMMARY OF THE INVENTION

It is an object of the present disclosure to provide a method for moulding a blade shell for a wind turbine blade and a mould system for moulding a blade shell for of wind turbine blade, which overcomes at least some of the disadvantages of the prior art.

In particular, it is an object of the present invention to provide a method for moulding a blade shell for a wind turbine blade and a mould system for moulding a blade shell for a wind turbine blade, which improves the process of positioning of components as well as facilitating decreased manufacturing time. Improvement in the process of positioning elements may further decrease manufacturing variations and enhance mechanical properties of the assembled blade, in addition to making the working environment safer for the staff.

Thus, the present invention relates to a method for moulding a blade shell of a wind turbine blade with a mould system comprising a first mould for manufacturing a first blade shell part of the wind turbine blade and a second mould for moulding a second blade shell part of the wind turbine blade. The first mould has a first moulding side with a first moulding surface that defines an outer shape of the first blade shell part. The first mould comprises a first mould flange along at least a part of the periphery of the first moulding surface. The first mould flange is configured to provide a first shell part flange along at least a part of the periphery of the outer shape on the first blade shell part. The second mould has a second moulding side with a second moulding surface that defines an outer shape of the second blade shell part. The method comprises providing a first blade shell part on the first moulding surface. The method comprises providing a second blade shell part on the second moulding surface. The method comprises providing one or more fastening elements attachable to the first mould and being configured to secure the first blade shell part to the first mould during rotation and positioning of the first mould. The one or more fastening elements including a first fastening element being configured to secure the first blade shell part to the first mould at a first fastening position along the first mould flange. The method comprises securing the first blade shell part to the first mould with the one or more fastening elements. The method comprises providing a measurement arrangement. The measurement arrangement is configured to measure displacement of the first shell part flange relative to the first mould flange.

The method comprises rotating and positioning the first mould such that the first moulding side is facing the second moulding side. The method comprises while rotating and positioning the first mould, measuring displacement of the first shell part flange relative to the first mould flange by the measurement arrangement at a first measurement position along the first mould flange.

Also disclosed is a mould system, such as a mould system capable of performing the method for moulding a blade shell of a wind turbine blade. For example, a mould system is disclosed comprising a first mould for manufacturing a first blade shell part of the wind turbine blade and a second mould for moulding a second blade shell part of the wind turbine blade. The first mould has a first moulding side with a first moulding surface that defines an outer shape of the first blade shell part. The second mould has a second moulding side with a second moulding surface that defines an outer shape of the second blade shell part. The mould system is configured to rotate and position the first mould such that the first moulding side is facing the second moulding side and such that the first blade shell part may be joined with the second blade shell part, e.g. by gluing the first blade shell part to the second blade shell part, so as to form the blade shell of the wind turbine blade. The first mould comprises a first mould flange along at least a part of the periphery of the first moulding surface. The first mould flange is configured to provide a first shell part flange along at least a part of the periphery of the outer shape on the first blade shell part. The mould system comprises one or more fastening elements attachable to the first mould and being configured to secure the first blade shell part to the first mould during rotation and positioning of the first mould. The one or more fastening elements includes a first fastening element configured to secure the first blade shell part to the first mould at a first fastening position along the first mould flange. The mould system comprises a measurement arrangement comprising one or more measurement units including a first measurement unit. The measurement arrangement is configured to measure displacement of the first shell part flange relative to the first mould flange. The first measurement unit is configured to measure displacement of the first shell part flange relative to the first mould flange at a first measurement position along the first mould flange.

It is an advantage of the present disclosure that an improved quality of the wind turbine blade may be provided, as the mould system may monitor and control the operation of rotating and positioning of a first mould on top of the second mould, thus variations in the process of rotating and positioning may be decreased in the final product.

The displacement of the first shell part flange relative to the first mould flange indicates an increased distance between the first mould flange and the first shell part flange. Displacement may occur for instance if the fastening element malfunctions or has deficiencies, such that the first shell part is no longer correctly positioned in the mould. Thus, it is an advantage of the present disclosure that a safer and more effective way of moulding a blade shell of a wind turbine blade is provided, as the disclosed mould system and method facilitates an automated way of controlling the positioning and rotating of a mould system, while also potentially preventing a blade shell being unintentionally released from the mould. Furthermore, the present disclosure provides a solution which eliminates or at least reduces the need for manual inspection, which in some situations may be dangerous for the person inspecting.

It is an even further advantage of the present disclosure that the measured displacement may be stored for individual wind turbine blades and used to backtrack the moulding process, e.g. in case of detected weaknesses in a particular wind turbine blade. Historical data of the mould system at the clamps may also provide data related to the quality of each blade.

It is envisaged that any embodiments or elements as described in connection with any one aspect may be used with any other aspects or embodiments, mutatis mutandis.

The one or more measurement units of the measurement arrangement includes a first measurement unit. The one or more measurement units may include a second measurement unit. The first measurement unit is configured to measure displacement of the first shell part flange relative to the first mould flange at a first measurement position along the first mould flange. The second measurement unit is configured to measure displacement of the first shell part flange relative to the first mould flange at a second measurement position along the first mould flange.

The measurement units, such as the first measurement unit and/or the second measurement unit may comprise a first portion and a second portion. The second portion may be movable and/or rotatable about a joint, e.g. a hinge joint relative to the first portion. For example, the second portion of the first measurement unit may be movable and/or rotatable about a joint, e.g. a hinge joint, relative to the first portion of the first measurement unit. The second portion of the second measurement unit may be movable and/or rotatable about a joint, e.g. a hinge joint, relative to the first portion of the second measurement unit.

The one or more measurement units may comprise an ultrasonic sensor. The one or more measurement units may comprise an optical sensor, e.g. a laser sensor. The first measurement unit and/or the second measurement unit may comprise an ultrasonic sensor and/or an optical sensor. The senor may send a signal and measure the reflected signal from the first mould shell part, e.g. the reflected signal from the first shell part flange.

The measurement arrangement may be reset, e.g. the measurement arrangement may be reset after securing the first blade shell part to the first mould with the one or more fastening elements, e.g. the measurement unit may be reset before rotating and position the first mould. Resetting the measurement arrangement may comprise setting a measurement condition as a zero point. A measured value divergent from the zero point may indicate a displacement of the first shell part flange and the first mould flange.

The one or more measurement units may be configured to be attached to the first mould. Providing the measurement arrangement may comprise attaching one or more measurement units to the first mould, e.g. attaching a first measurement unit and/or a second measurement unit to the mould. For example, the first portion of the first measurement unit may be attached to the mould. The first portion of the first measurement unit may be stationary relative to the mould. The first portion of the second measurement unit may be attached to the mould. The first portion of the second measurement unit may be stationary relative to the mould. Providing the measurement arrangement may comprise attaching a plurality of measurement units distributed, e.g. evenly distributed, along the mould in the longitudinal direction of the mould.

The mould system may comprise a plurality of fastening elements, e.g. including the first fastening element and a second fastening element. The second fastening element may be configured to secure the first blade shell part to the first mould at a second fastening position along the first mould flange. The first measurement position may be between the first fastening position and the second fastening position.

The fastening elements, such as the first fastening element and/or the second fastening element may comprise a first portion and a second portion. The second portion may be movable and/or rotatable about a joint, e.g. a hinge joint relative to the first portion. For example, the second portion of the first fastening element may be movable and/or rotatable about a joint, e.g. a hinge joint, relative to the first portion of the first fastening element. The second portion of the second fastening element may be movable and/or rotatable about a joint, e.g. a hinge joint, relative to the first portion of the second fastening element.

The first portion of the first fastening element may be attached to the mould, e.g. the first mould. The first portion of the first fastening element may be stationary relative to the mould. The first portion of the second fastening element may be attached to the mould, e.g. the first mould. The first portion of the second fastening element may be stationary relative to the mould.

The plurality of fastening elements may be distributed, e.g. evenly distributed, along the mould, e.g. in the longitudinal direction of the mould. The plurality of fastening elements may be distributed, e.g. evenly distributed, on the mould on the side corresponding to the leading edge and/or the side corresponding to the trailing edge.

The first measurement unit may be attached to the first fastening element, Providing the one or more measurement units may comprise attaching a first measurement unit to the first fastening element. The first measurement unit may be attached to the first fastening element, e.g. by soldering or bolting. For example, the first portion of the first measurement unit may be attached to the first portion or the second portion of the first fastening element. Alternatively, the first measurement unit may be attached to the mould near or at the first fastening element. Alternatively, the first measurement unit may be attached to the mould between the first fastening element and the second fastening element.

While rotating and positioning the first mould, displacement of the first shell part flange relative to the first mould flange may be measured by the measurement arrangement at a second measurement position along the first mould flange, e.g. by the second measurement unit. The measurement arrangement may comprise the second measurement unit configured to measure displacement of the first shell part flange relative to the first mould flange at the second measurement position along the first mould flange. The second measurement unit may be attached to the second fastening element, e.g. by soldering or bolting. For example, the first portion of the second measurement unit may be attached to the first portion or the second portion of the first fastening element. Alternatively, the second measurement unit may be attached to the mould near or at the second fastening element. Alternatively, the second measurement unit may be attached to the mould between the first fastening element and the second fastening element.

The mould system may comprise a plurality of measurement units. The plurality of measurement units may be distributed, e.g. evenly distributed, along the mould in the longitudinal direction of the mould. The plurality of measurement units may be distributed, e.g. evenly distributed, on the mould on the side corresponding to the leading edge and/or the side corresponding to the trailing edge.

The one or more measurement units, such as the first measurement unit and/or the second measurement unit, may comprise an accelerometer and/or a gyroscope, e.g. for registering the movement and/or position of the first mould during positioning and rotating of the first mould. The one or more measurement units may comprise a plurality of accelerometers and/or a plurality of gyroscopes. The measurement arrangement may comprise one or more accelerometers and/or gyroscopes.

The method may comprise receiving data from the measurement arrangement. The mould system may comprise a processing unit configured to receive data from the measurement arrangement, e.g. from the one or more measurement units.

The received data, e.g. comprising data received from the first measurement unit, may comprise a first displacement value indicative of displacement of the first shell part flange relative to the first mould flange at the first measurement position. The received data, e.g. comprising data received from the second measurement unit, may comprise a second displacement value indicative of displacement of the first shell part flange relative to the first mould flange at the second measurement position.

The method may comprise determining whether the first displacement value is above or equal to a first displacement limit. For example, the processing unit may be configured to: determine whether the first displacement value is above or equal to the first displacement limit. The method may comprise determining whether the second displacement value is above or equal to a second displacement limit. For example, the processing unit may be configured to: determine whether the second displacement value is above or equal to the second displacement limit.

In accordance with the first displacement value being above or equal to the first displacement limit, a first notification may be output, e.g. by an output unit. In accordance with the second displacement value being above or equal to the second displacement limit, a second notification may be output, e.g. by the output unit.

The output unit may be a speaker or a light arrangement. Outputting the first and/or second notification may comprise outputting an audio signal and/or a visual signal, e.g. the first and/or second notification may be an audio signal and/or a visual signal. The notification may warn the staff about a potential detachment of the blade shell part from the mould and the staff may stop or reverse the positioning and rotating of the first mould to avoid accidents.

The first displacement limit may be different than the second displacement limit, e.g. the first displacement limit may be larger than the second displacement limit or the first displacement limit may be smaller than the second displacement limit. The first displacement limit and the second displacement limit may be the same. The first displacement limit may be a maximum tolerable displacement of the first shell part flange and the first mould flange at the first measurement position. The second displacement limit may be a maximum tolerable displacement of the first shell part flange and the first mould flange at the second measurement position. The maximum tolerable displacement at positions distanced from the clamps, e.g. midways between two fastening positions, may be set higher than the maximum tolerable displacement at or near a clamp.

The first mould may be rotated and positioned, e.g. the first mould may be rotated and positioned by a positioning device. The first mould may be configured to be positioned and rotated between a first mould position, a second mould position and a third mould position. The first mould may be positioned in the first mould position before positioning and rotating the first mould. The first mould may be positioned and rotated between 0-180 degrees, e.g. between the first mould position and the third mould position. In the third mould position the first moulding side may be facing the second moulding side, e.g. to form a closed blade shell. The second mould position may be between the first mould position and the third mould position.

The first and/or second displacement limit may be based on the position and/or rotation of the first mould. For example, the first and/or second displacement limit may be altered depending on the position and/or rotation of the first mould. The first and/or second displacement limit when the first mould is between the first mould position and the second mould position may be smaller than the first and/or second displacement limit when the first mould is between the second mould position and the third mould position. The second mould position may correspond to the position wherein the first mould is rotated between 65-125 degrees, such as 80-100 degrees, e.g. 90 degrees.

The first mould flange may be aligned with the second mould flange, e.g. the first shell part flange may be aligned with the second shell part flange. Rotating and positioning the first mould such that the first moulding side is facing the second moulding side may comprise aligning the first mould flange with the second mould flange. The first mould flange may be attached to the second mould flange, e.g. with glue.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
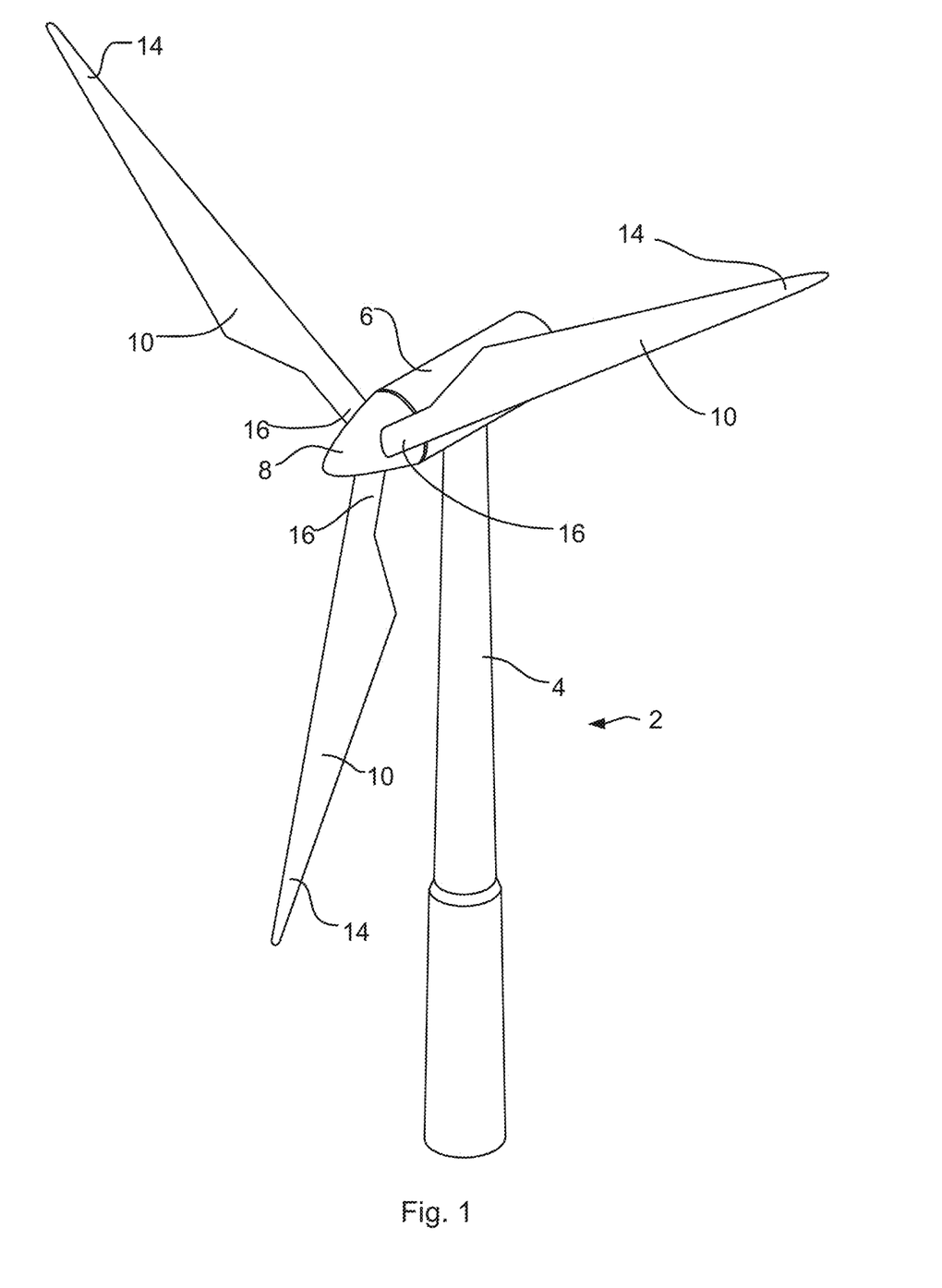
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
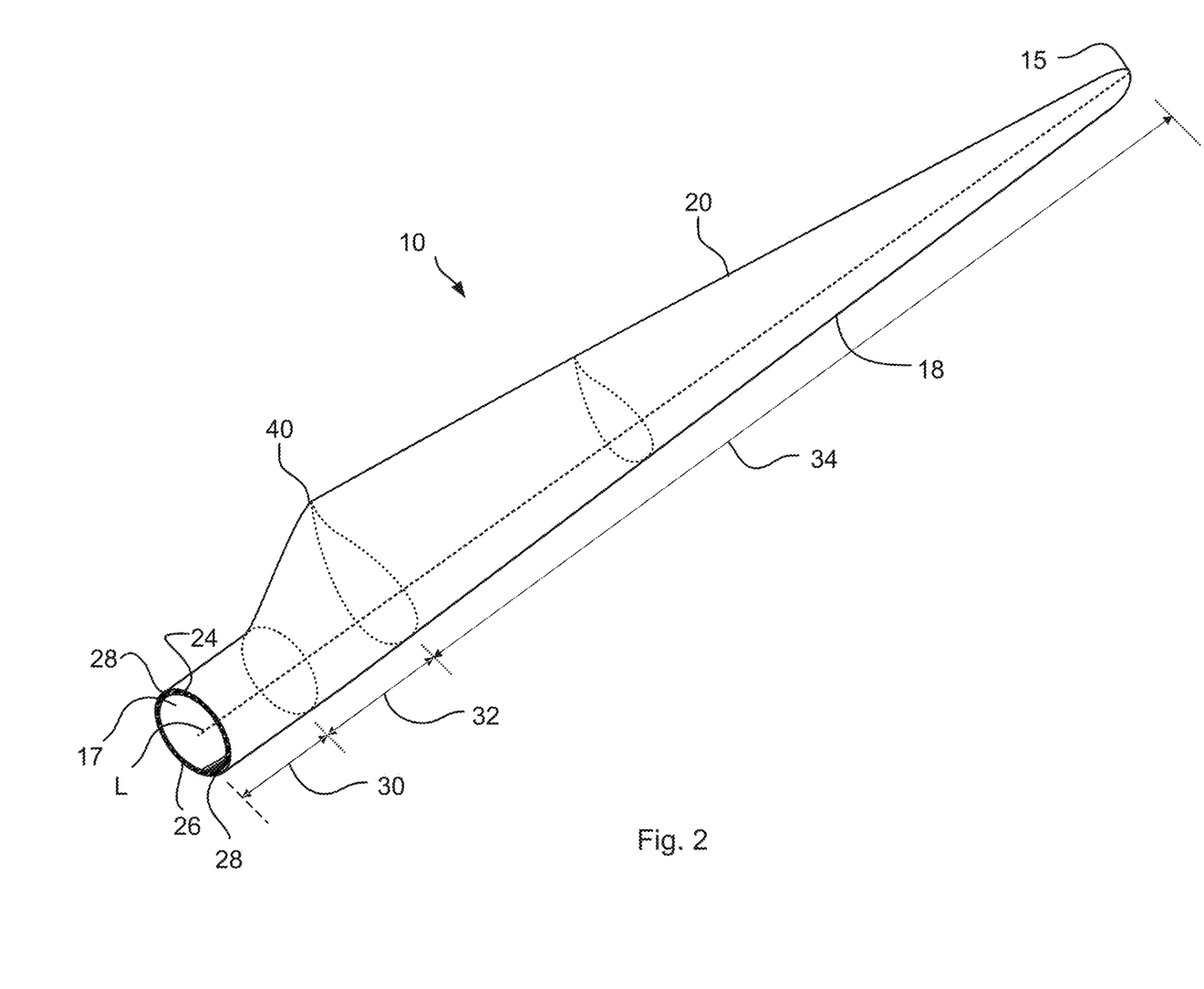
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical profile of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part.

Figure 3:
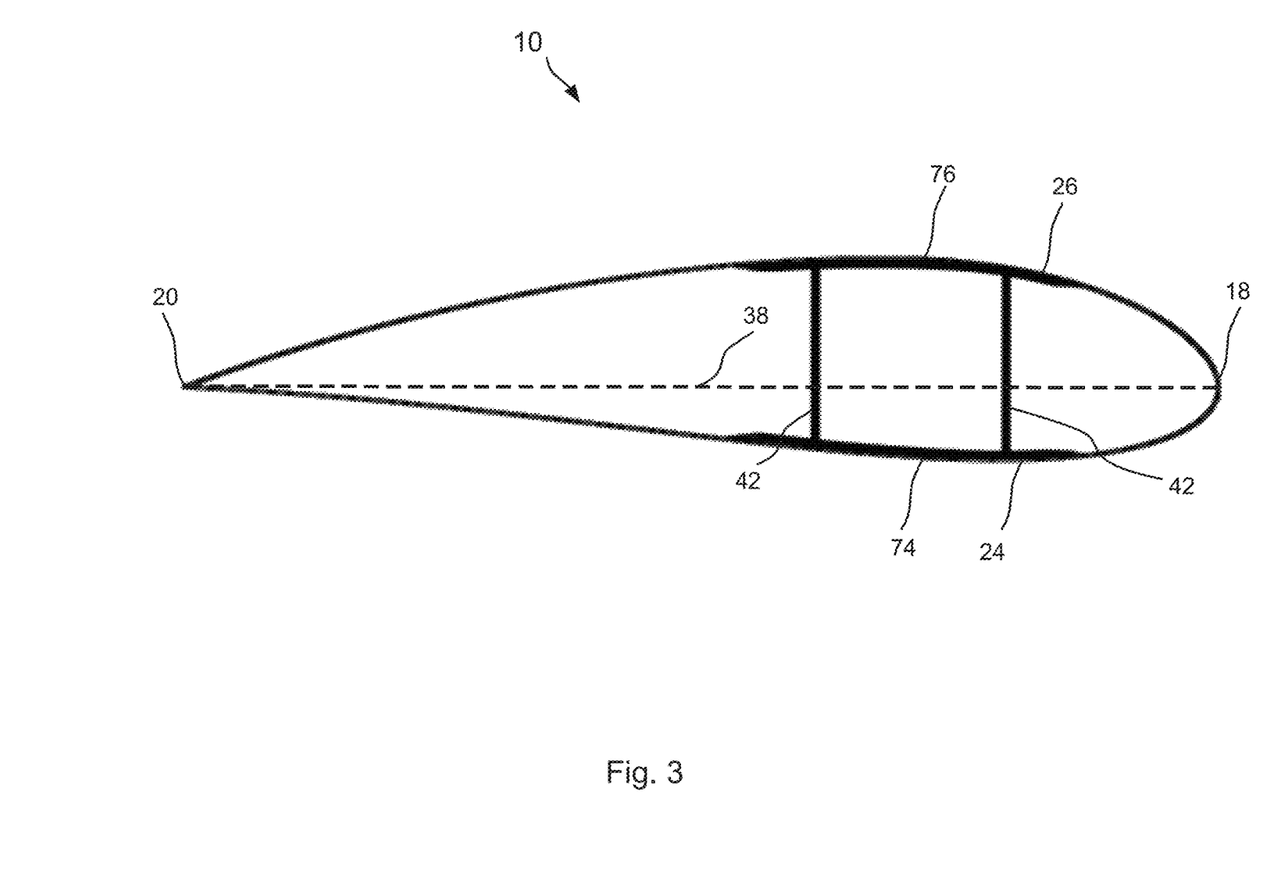
FIG. 3 is a schematic diagram illustrating an exemplary wind turbine blade.

The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape, FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres while the rest of the shell parts 24, 26 may comprise glass fibres.

Figure 4A:
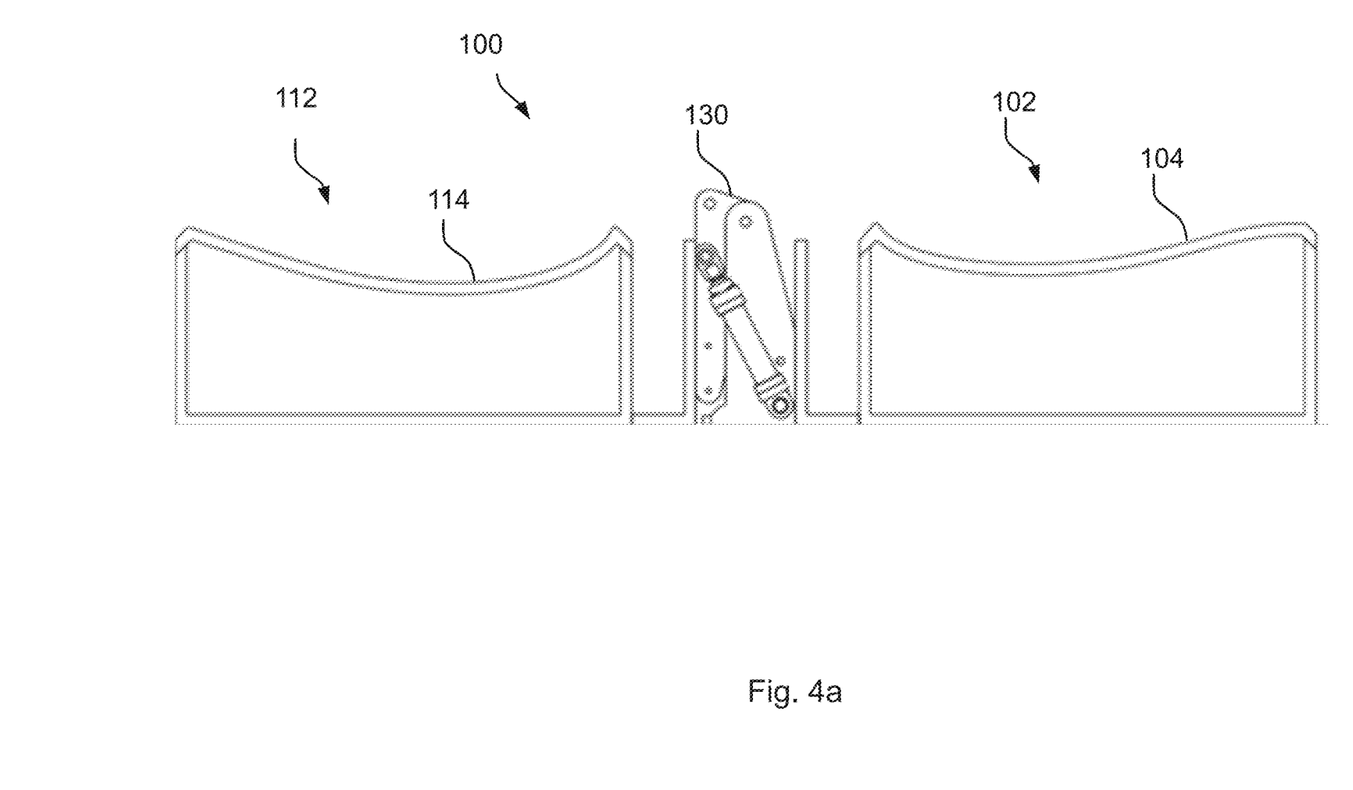
FIGS. 4*a-b* are schematic diagrams illustrating an exemplary mould system.

FIG. 4*a* is a schematic diagram illustrating an exemplary mould system for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade. The mould system 100 further comprises a positioning device 130 configured for positioning and rotating the first mould 102 and the second mould 112 such that a first moulding side 104 of the first mould 102 is facing a second moulding side 114 of the second mould 112. The positioning device 130 may be configured for lifting and rotating the first mould 102.

Figure 4B:
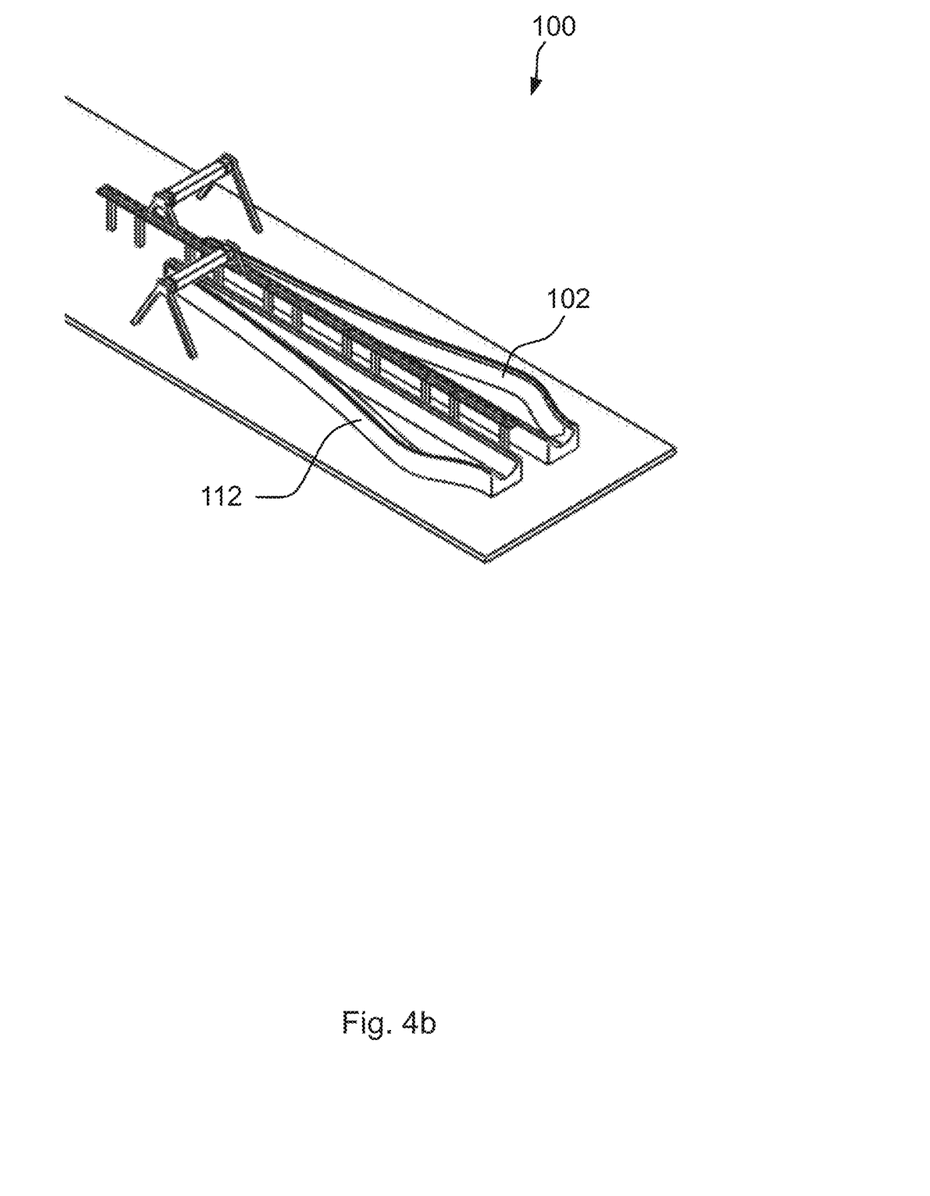

FIG. 4*b* is a schematic diagram illustrating the exemplary mould system, such as the mould system in the previous figures, for moulding a blade shell of a wind turbine blade. The mould system 100 comprises a first mould 102 and a second mould 112. The first mould 102 is configured for manufacturing a first blade shell part of a wind turbine blade, such as an upwind shell part of the wind turbine blade. The second mould 112 is configured for manufacturing a second blade shell part of the wind turbine blade, such as a downwind shell part of the wind turbine blade.

Figure 5A:
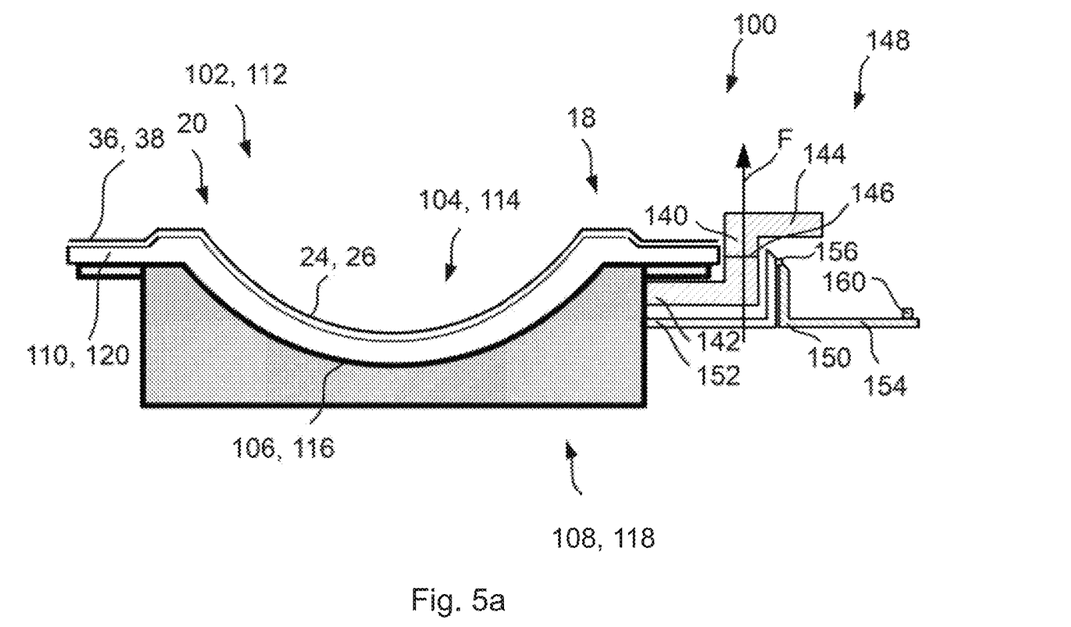
FIGS. 5*a-b* are schematic diagrams illustrating an exemplary mould system.
Figure 5B:
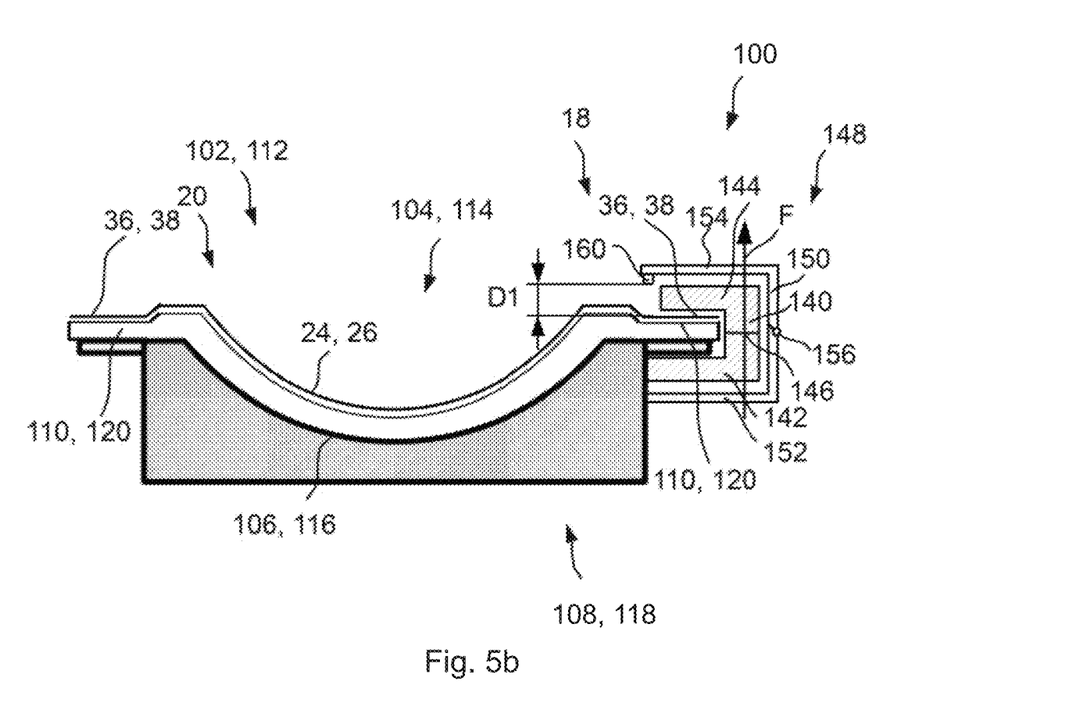

FIGS. 5*a* and 5*b* are schematic diagrams illustrating parts of exemplary mould systems 100, such as the mould system 100 as illustrated in FIGS. 4*a-b*. The mould system 100 comprises a mould, which may be a first mould 102 for manufacturing a first blade shell part 24 of a wind turbine blade or a second mould 112 for manufacturing a second blade shell part 26 of the wind turbine blade. The mould 102, 112 has a moulding side 104, 114, with a moulding surface 106, 116 that defines an outer shape of the blade shell part 24, 26. The mould 102, 112 has a non-moulding side 108, 118 opposite the moulding side 104, 114. The mould 102, 112 comprises a mould flange 110, 120 along at least a part of the periphery of the moulding surface 106, 116. The mould flange 110, 120 provides a shell part flange, such as a first shell part flange 36 or a second shell part flange 38, on the blade shell part 24, 26.

The mould system 100 comprises a fastening element 140 for fixating the blade shell part 24, 26 to the mould 102, 112. The fastening element 140 ensures that the shell part 24, 26 does not separate from, i.e. fall out of, the mould 102, 112 during turning and positioning of the mould(s). A first portion 142 of the fastening element 140 may be attached to the mould 102, 112. The first portion 142 of the fastening element 140 may be stationary relative to the mould 102, 112.

The fastening element 140 may comprise a second portion 144. The second portion 144 may be movable and/or rotatable at a joint 146 about a fastening element axis F, such that the mould flange 110, 120 is accessible during blade shell lay-up. After blade shell lay-up, the second portion 114 of the fastening element 140 may be positioned to fasten tightly around the blade shell part 24, 26 and the mould 102, 112. The fastening element 140 and the measurement unit 150 illustrated in FIG. 5a-5b are attached to the leading edge side 18 of the blade shell part 24, 26, but the fastening element 140 and the measurement unit 150 may alternatively or additionally be attached to the trailing edge 20 of the blade shell part 24, 26.

A first portion 152 of the measurement unit 150 may be attached to the mould 102, 112. The first portion 152 of the measurement unit 150 may be stationary relative to the mould 102, 112. The measurement unit 150 may comprise a second portion 154 movable and/or rotatable about a joint 156, e.g. a hinge joint. The measurement unit 150 comprises a sensor 160. The sensor 160 may be an optical sensor or an ultrasonic sensor. The sensor 160 is configured to measure the distance between the shell part flange 36, 38 and the mould flange 110, 120, e.g. by measuring the distance D1 at initial clamping and calculating the displacement therefrom during turning and rotation of the mould 102, 112. Displacement may occur for instance if the fastening element 140 malfunctions, has deficiencies or is not properly closed/locked, e.g. such that the first shell part 24, 26 is no longer correctly positioned in the mould 102, 112.

The measurement units 150 may comprise an accelerometer and/or a gyroscope (not shown) to register movement and/or position of the mould 102, 112. For example, such as to determine where in the position/rotation cycle the mould is. The mould system 100 may comprise a processing unit (not shown) configured to receive data from the measurement arrangement 148.

Even though the mould system is illustrated with a fastening element 140 and a measurement unit 150 around one flange (e.g. flange at the leading edge), fastening elements 140 and measurement units 150 may also be attached to the other flange (e.g. flange at the trailing edge).

Figure 6:
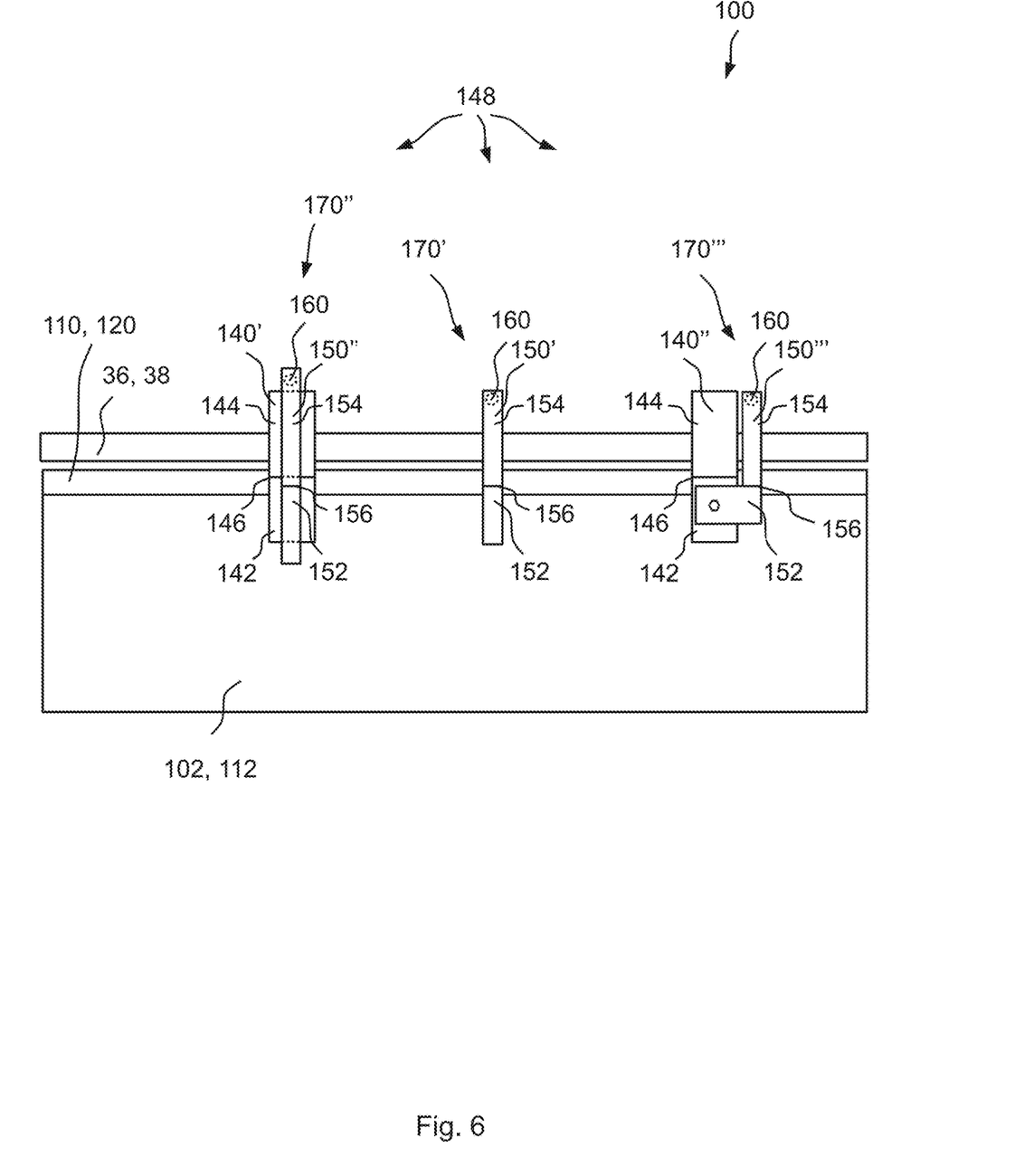
FIG. 6 is a schematic diagram illustrating an exemplary mould system.

FIG. 6 illustrates part of a mould system 100, e.g. the mould system of FIG. 5a-5b. The mould system 100 comprises a plurality of fastening elements, including a first fastening element 140' and a second fastening element 140". The mould system 100 comprises a plurality of measurement units, including a first measurement unit 150', a second measurement unit 150" and a third measurement unit 150'''. A measurement unit may be attached to the fastening elements, such as illustrated for the second fastening element 140" and the third measurement unit 150''', e.g. by soldering or bolting the first portion 152 of the measurement unit 150''' to a first portion 142 of the fastening element 140". The first portion 142 of the fastening element 140" may be stationary relative to the mould. Alternatively or additionally, a measurement unit may be attached to the mould 102, 112, such as illustrated for the first measurement unit 150' and the second measurement unit 150", e.g. by soldering. The first measurement unit 150' may be configured measure the displacement of the shell part flange 36, 38 from the mould flange 110, 120 at a measurement position between the first fastening element 140' and the second fastening element 140". The second measurement unit 150" may be configured to measure the displacement at or near the first fastening element 140'.

The first measurement unit 150' measures the displacement of the first shell part flange 36, 38 relative to the first mould flange 110, 120 at a first measurement position 170' along the first mould flange 110, 120, e.g. between the first fastening element 140' and the second fastening element 140". The second measurement unit 150" measures the displacement of the first shell part flange 36, 38 relative to the first mould flange 110, 120 at a second measurement position 170" along the first mould flange 110, 120, e.g. near or at the first fastening element 140'. The third measurement unit 150''' measures the displacement of the first shell part flange 36, 38 relative to the first mould flange 110, 120 at a third measurement position 170''' along the first mould flange 110, 120, e.g. at or near the second fastening element 140".

Any combination of the configurations of fastening elements 140, 140', 140" and measurement units 150, 150', 150" 150''' shown in FIG. 5a-5b and FIG. 6 is possible.

Figure 7:
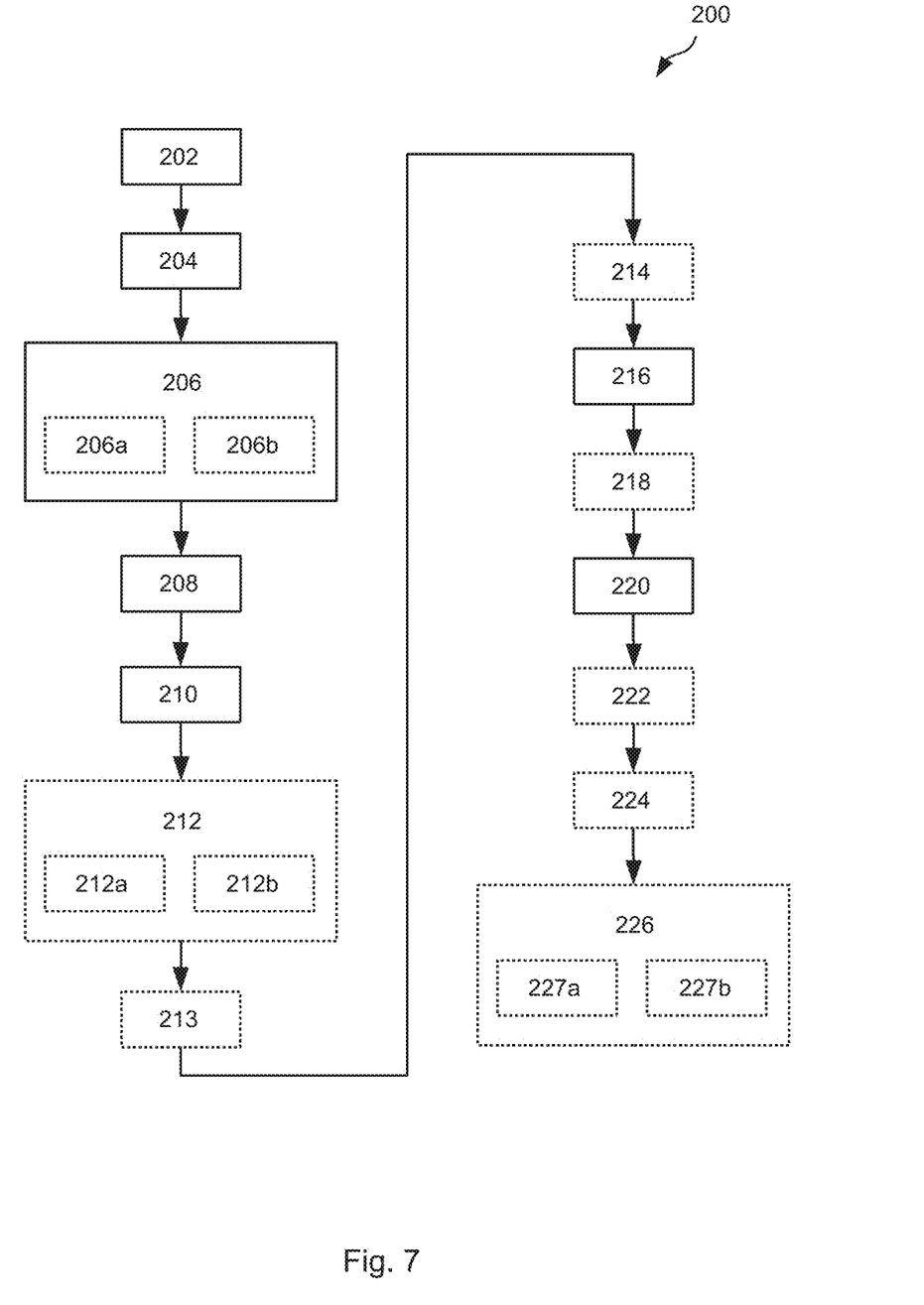
FIG. 7 is a block diagram of an exemplary method.

FIG. 7 is a block diagram of an exemplary method 200 moulding a blade shell of a wind turbine blade with a mould system, e.g. the mould system of the previous figures.

The method 200 comprises providing 202 a first blade shell part, such as the pressure side blade shell part, on the first moulding surface of the first mould, such as the first mould of FIGS. 4-6.

The method 200 comprises providing 204 a second blade shell part, such as the suction side blade shell part, on the second moulding surface of the second mould, such as the second mould of FIGS. 4-6.

The method 200 comprises providing 206 one or more fastening elements, such as providing 206a a first fastening element and/or providing 206b a second fastening element, such as the first and second fastening elements of FIGS. 5-6.

The method 200 comprises securing 208 the first blade shell part to the first mould by the first fastening element and/or the second fastening element. The first fastening element is configured to secure the first blade shell part to the first mould at a first fastening position along the first mould flange. The second fastening element is configured to secure the first blade shell part to the first mould at a second fastening position along the first mould flange.

The method 200 comprises providing 210 a measurement arrangement, such as the measurement arrangement of FIGS. 5-6, configured to measure displacement of the first shell part flange relative to the first mould flange. The measurement arrangement may comprise a first measurement unit, and the method may comprise attaching 212 the first measurement unit, such as attaching 212a the first measurement unit to the mould or attaching 212b the first measurement unit to the first fastening element. Additionally, the measurement arrangement may comprise a second measurement unit, and the method may comprise attaching the second measurement unit to the mould or to the second fastening element.

The method 200 may comprise resetting 213 the measurement arrangement, e.g. the measurement arrangement may be reset by resetting the first measurement unit after the first measurement unit has been attached to the mould or the first fastening element.

The method 200 comprises rotating 216 and positioning the first mould such that the first moulding side is facing the second moulding side. The method may comprise providing 214 a positioning device for rotating and positioning the first mould.

The method 200 may comprise aligning 218 the first mould flange with the second mould flange, e.g. aligning the first shell part flange with the second shell part flange.

The method 200 comprises, while rotating and positioning, measuring 220 displacement of the first shell part flange relative to the first mould flange by the measurement arrangement at a first measurement position, such as a first measurement position between the first fastening element and the second fastening element.

The method 200 may comprise, while rotating and positioning, measuring 222 displacement of the first shell part flange relative to the first mould flange by the measurement arrangement at a second measurement position, such as a second measurement position at or near the first fastening element or the second fastening element.

The method 200 may comprise receiving data from the measurement arrangement comprising a first displacement value and/or a second displacement value. The method may comprise determining 224 whether the first displacement value is above or equal to a first displacement limit and/or whether the second displacement value is above or equal to a second displacement limit. The first displacement limit may be a maximum tolerable displacement of the first shell part flange relative to the first mould flange at the first measurement position. The second displacement limit may be a maximum tolerable displacement of the first shell part flange relative to the first mould flange at the second measurement position.

In accordance with determining that the first displacement value is above or equal to the first displacement limit and/or determining that the second displacement value is above or equal to the second displacement limit, the method may comprise outputting 226 a notification, such as a first notification and/or a second notification. Outputting 226 the notification may comprise outputting 227a an audio signal and/or outputting 277b a visual signal.

It should be noted that the order of the steps of the method may be interchanged and/or some of the steps may be performed simultaneously. For example, measuring displacement at the second measurement position is illustrated as being performed after measuring displacement at the first displacement position, it will be understood measuring displacement at the first and second measurement position may alternatively be performed simultaneously.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
36 first shell part flange
38 second shell part flange
40 shoulder
42 shear web or spar side
74 first spar cap
76 second spar cap
100 mould system
102 first mould
104 first moulding side
106 first moulding surface
108 first non-moulding side
110 first mould flange
112 second mould
114 second moulding side
116 second moulding surface
118 second non-moulding side
120 second mould flange
130 positioning device
140 fastening element
140' first fastening element
140" second fastening element
142 first portion of fastening element
144 second portion of fastening element
146 joint
148 measurement arrangement
150 measurement unit
150' first measurement unit
150" second measurement unit
150''' third measurement unit
152 first portion of measurement unit
154 second portion of measurement unit
156 joint
160 sensor
170' first measurement position
170" second measurement position
170''' third measurement position
200 method
202 providing first blade shell part
204 providing second blade shell part
206 providing fastening elements
206a providing first fastening element
206b providing second fastening element
208 securing first blade shell part
210 providing measurement arrangement
212 attaching first measurement unit
212a attaching first measurement unit to mould
212b attaching first measurement unit to first fastening element
213 resetting
214 providing positioning device
216 rotating and positioning first mould
218 aligning
220 while rotating and positioning, measuring displacement at first measurement position
222 while rotating and positioning, measuring displacement at second measurement position
222 receiving data
224 determining
226 outputting notification
277a outputting audio signal
277b outputting visual signal

The invention claimed is:

1. A mould system for moulding a blade shell of a wind turbine blade, the mould system comprising a first mould for manufacturing a first blade shell part of the wind turbine blade and a second mould for moulding a second blade shell part of the wind turbine blade,
wherein the first mould has a first moulding side with a first moulding surface that defines an outer shape of the first blade shell part,
wherein the second mould has a second moulding side with a second moulding surface that defines an outer shape of the second blade shell part,
wherein the mould system is configured to rotate and position the first mould such that the first moulding side is facing the second moulding side and such that the first blade shell part may be joined with the second blade shell part so as to form the blade shell of the wind turbine blade,
wherein the first mould comprises a first mould flange along at least a part of the periphery of the first moulding surface, the first mould flange being configured to provide a first shell part flange along at least a part of the periphery of the outer shape on the first blade shell part,
wherein the mould system further comprises one or more fastening elements attachable to the first mould and being configured to secure the first blade shell part to the first mould during rotation and positioning of the first mould, the one or more fastening elements including a first fastening element being configured to secure the first blade shell part to the first mould at a first fastening position along the first mould flange,
wherein the mould system further comprises a measurement arrangement comprising one or more measurement units including a first measurement unit, wherein the measurement arrangement is configured to measure displacement of the first shell part flange relative to the first mould flange, wherein the first measurement unit is configured to measure displacement of the first shell part flange relative to the first mould flange at a first measurement position along the first mould flange, and
wherein the mould system further comprises a processing unit configured to receive data from the one or more measurement units, the data received from the one or more measurement units comprising data received from the first measurement unit comprising a first displacement value indicative of the displacement of the first shell part flange relative to the first mould flange at the first measurement position, and wherein the processing unit is configured to:
determine whether the first displacement value is above or equal to a first displacement limit; and
in accordance with the first displacement value being above or equal to the first displacement limit, outputting a first notification by an output unit.

2. The mould system according to claim 1, wherein the one or more measurement units comprise an ultrasonic sensor and/or an optical sensor.

3. The mould system according to claim 2, wherein the one or more measurement units comprise a laser sensor.

4. The mould system according to claim 1, wherein the one or more measurement units are configured to be attached to the first mould.

5. The mould system according to claim 1, wherein the first measurement unit is attached to the first fastening element.

6. The mould system according to claim 1, further comprising a plurality of fastening elements, including the first fastening element and a second fastening element, the second fastening element being configured to secure the first blade shell part to the first mould at a second fastening position along the first mould flange, and wherein the first measurement position is between the first fastening position and the second fastening position.

7. The mould system according to claim 1, wherein the measurement arrangement comprises a second measurement unit configured to measure displacement of the first shell part flange relative to the first mould flange at a second measurement position along the first mould flange.

8. The mould system according to claim 1, wherein the data received from the one or more measurement units comprises data received from the second measurement unit comprising a second displacement value indicative of displacement of the first shell part flange relative to the first mould flange at the second measurement position, and wherein the processing unit is configured to:
determine whether the second displacement value is above or equal to a second displacement limit, and
in accordance with the second displacement value being above or equal to the second displacement limit, output a second notification by an output unit.

9. The mould system according to claim 1, wherein the first displacement limit is different than the second displacement limit.

10. The mould system according to claim 9, wherein the first displacement limit is smaller than the second displacement limit.

11. The mould system according to claim 1, wherein the first and/or second displacement limit are based on the position and/or rotation of the first mould.

12. A method for moulding a blade shell of a wind turbine blade with a mould system comprising a first mould for manufacturing a first blade shell part of the wind turbine blade and a second mould for moulding a second blade shell part of the wind turbine blade, the first mould having a first moulding side with a first moulding surface that defines an outer shape of the first blade shell part, the first mould comprising a first mould flange along at least a part of the periphery of the first moulding surface, the first mould flange being configured to provide a first shell part flange along at least a part of the periphery of the outer shape on the first blade shell part, the second mould having a second moulding side with a second moulding surface that defines an outer shape of the second blade shell part, the method comprising:
providing a first blade shell part on the first moulding surface;
providing a second blade shell part on the second moulding surface;
providing one or more fastening elements attachable to the first mould and being configured to secure the first blade shell part to the first mould during rotation and positioning of the first mould, the one or more fastening elements including a first fastening element being configured to secure the first blade shell part to the first mould at a first fastening position along the first mould flange;
securing the first blade shell part to the first mould with the one or more fastening elements;
providing a measurement arrangement comprising one or more measurement units, wherein the measurement arrangement is configured to measure displacement of the first shell part flange relative to the first mould flange;

rotating and positioning the first mould such that the first moulding side is facing the second moulding side;

while rotating and positioning the first mould, measuring displacement of the first shell part flange relative to the first mould flange by the measurement arrangement at a first measurement position along the first mould flange;

a processing unit receiving data from the one or more measurement units, the data received from the one or more measurement units comprising data received from a first measurement unit comprising a first displacement value indicative of the displacement of the first shell part flange relative to the first mould flange at a first measurement position;

determining whether the first displacement value is above or equal to a first displacement limit; and in accordance with the first displacement value being above or equal to the first displacement limit, outputting a first notification by an output unit.

13. The method according to claim 12, further comprising while rotating and positioning the first mould, measuring displacement of the first shell part flange relative to the first mould flange by the measurement arrangement at a second measurement position along the first mould flange.

14. The method according to claim 13, further comprising receiving data from the measurement arrangement comprising a second displacement value indicative of displacement of the first shell part flange relative to the first mould flange at the second measurement position, and determining whether the second displacement value is above or equal to a second displacement limit; and in accordance with the second displacement value being above or equal to the second displacement limit, outputting a second notification.

15. The method according to claim 12, further comprising receiving data from the measurement arrangement comprising a first displacement value indicative of displacement of the first shell part flange relative to the first mould flange at the first measurement position, and determining whether the first displacement value is above or equal to a first displacement limit; and in accordance with the first displacement value being above or equal to the first displacement limit, outputting a first notification.

* * * * *